United States Patent [19]
Nakagawa et al.

[11] Patent Number: 5,165,205
[45] Date of Patent: Nov. 24, 1992

[54] DEVICE FOR VIBRATING MATERIALS TO BE GROUND

[75] Inventors: Takeo Nakagawa, Kawasaki; Hitoshi Ohmori, Tokyo; Kiyoshi Suzuki, Yokohama, all of Japan

[73] Assignee: Research Development Corporation of Japan, Tokyo, Japan

[21] Appl. No.: 269,145

[22] PCT Filed: Jun. 23, 1988

[86] PCT No.: PCT/JP88/00620
§ 371 Date: Oct. 28, 1988
§ 102(e) Date: Oct. 28, 1988

[87] PCT Pub. No.: WO88/10174
PCT Pub. Date: Dec. 29, 1988

[51] Int. Cl.$^5$ .......................... B24B 41/06; B24B 1/04
[52] U.S. Cl. .......................... 51/230; 51/121; 51/283 R; 366/108; 366/111
[58] Field of Search .............. 51/109 R, 230, 59 SS, 51/240 R, 58, 60, 121, 283 R, 217 S, 34 R; 366/108, 111, 112

[56] References Cited
U.S. PATENT DOCUMENTS

| 2,439,219 | 4/1948 | O'Connor | 366/111 |
| 2,939,250 | 6/1960 | Kline | 51/34 R |
| 3,435,562 | 4/1969 | Maillet | 51/60 |
| 4,232,972 | 11/1980 | Levin | 366/108 |

FOREIGN PATENT DOCUMENTS

0740483 6/1980 U.S.S.R. .................................. 51/7

Primary Examiner—Robert Rose
Attorney, Agent, or Firm—Michael J. Striker

[57] ABSTRACT

A device for vibrating a workpiece to be processed, serves as a workpiece table to be used to processing the workpiece by means of a rotating tool having a grindstone. The device comprises a table for supporting the workpiece and a base to be detachably furnished to the table of a processing machine. The table is supported on the base via a plurality of piezoelectric actuators each of which is connected electrically to an external controller for vibrating the workpiece being processed by actuating selectively a driving voltage from the controller. The piezoelectric actuator is a laminated piezoelectric element, at least one end of which is secured to the base.

10 Claims, 7 Drawing Sheets

Oval orbit : x, y Signals

Function : Sin wave

Fig. 7-B

Function : Sew wave

Fig. 7-C

Function : Rectangular wave

DEVICE FOR VIBRATING MATERIALS TO BE GROUND

TECHNICAL FIELD

The present invention relates to a device for vibrating materials to be ground or cut which is suitable to processing of hard and brittle materials represented by such as ceramics.

BACKGROUND OF THE INVENTION

As processings of various kinds of materials, there has been a method of carrying out grinding or cutting with grinding powders. In this method, a workpiece to be processed is fixed on a machine table with a vise or chuck, and the workpiece is finished on the surface or formed with grooves or shaped in cores by relative movement exerted between the machine table and a grindstone mounted on a main shaft and rotating at high speed.

However, conventionally, the machine table merely held the workpiece and it reciprocated or rotated as holding the workpiece. Therefore, since the grindstone was only pressed against the workpiece at a fixed load while rotating, the processing efficiency was extremely lowered, if the workpiece was the ceramics as said above. The processed precision was bad, and complicated and fine shapes could not be created.

A supersonic impact grinding method has been known as a countermeasure to the above problem, where the grindstone is provided to a supersonic oscillator at a hone end and is given the supersonic oscillation so that the grinding powders are beaten against the workpiece to accelerate brittle fracture.

However, since this method must make the grindstone resonate at a determined certain frequency of supersonic vibrator, usable grindstones are limited with respect to shapes or sizes, and a once assembled supersonic vibrating unit cannot be changed. So, the processing is limited to forming of bores, and since the grindstone shaped in cup cannot be attached in mass, wide surfaces cannot be finish -processed. Besides, the hones should be disposed in series and in multi-step for effecting enough displacement of the grindstone, and further a special attention should be paid for securing rigidity of a tool support. Accordingly, there is a problem that an apparatus is large-scaled and expensive.

The present invention has been designed to solve the above problems. It is an object of the invention to provide a device for vibrating materials to be ground, where restrictions about the condition as the tool side are cancelled, and the workpiece is positioned on the table of the processing machine having main shafts for grinder of the machining center, only by which the workpiece can be processed with the grinding powders at high efficiency and high precision.

It is another object of the invention to provide a device for vibrating materials to be ground, which may easily realize complicated processings with an electric discharging process, an electrolytic process and others.

DISCLOSURE OF THE INVENTION

For accomplishing the above mentioned objects, the invention employs piezoelectric actuators so as to give low frequency vibration to the workpiece being processed with the grain powders and enable multi-partite freedom of vibrating properties.

The present invention concerns a workpiece table device which is used for processing the workpiece by means of a rotating tool with grindstone, and is provided with a table supporting the workpiece directly or via a fixture, and a base which is independent of the table and is detachably attached to a table installed to the processing machine such as the grinder or the machining center. The table is supported by the base via a plurality of respectively independent piezoelectric actuators. In other words, the actuators are held between the table and the base. Each of the actuators is connected to an external controller, and is vibrated by activation with a drive voltage from the controller so as to vibrate the workpiece during processing.

The base is shaped in box or disc with an opened upper surface. If the base is shaped in box, the table is positioned centrally thereof in plane, and each side of the table in X-, Y- and Z-directions is supported by a plurality of groups of the piezoelectric actuators. In this case, the workpiece supported in accordance with the table is effected with translational motion in the horizontal and vertical directions or is vibrated by rotation.

If the base is shaped in disc, the table is supported by a plurality of the piezoelectric actuators. In this case, the workpiece may be given the rotational vibration and the translational motion in the vertical direction with respect to the table.

In any cases, since the tool side is not restrained by any conditions, the peripheral velocity of the tool may be heightened up to an inherent limit of the machine without limiting the processing way. Besides, the processing load may be largely reduced and so the working is performed at high efficiently. Loading by the grinding powders are removed or moderated by vibration.

For the piezoelectric actuator, a piezoelectric element of laminated layer is used, in which at least one end in expansion directions is fixed to a main body thereof, and other ends are adhered or secured to the table. In this latter case, a spring is used so that the piezoelectric element of the laminated layer is given pre-pressure by the spring force.

A control device is provided with an electric device controller having a switching circuit for a piezoelectric actuator, a power amplifier, and a computer which assigns an output voltage of the power amplifier to a determined piezoelectric actuator, and controls the voltage level. It is preferable to connect a frequency controlling function generator to the power amplifier.

BRIEF DESCRIPTION OF THE DRAWINGS

FIGS. 2-A and 2-B are side views, partially in section, showing relation between the base of the actuator and the table;

FIG. 6-A is an explanatory view showing vibrations available in the invention;

FIG. 7-A, 7-B and 7-C are signal waves when the function generator is used;

MOST PREFERABLE EMBODIMENT FOR PRACTICING THE INVENTION

Explanations will be made to embodiments of the invention with reference to the attached drawings. FIGS. 1 to 5 illustrate a 1st embodiment of the invention.

Figure 1:
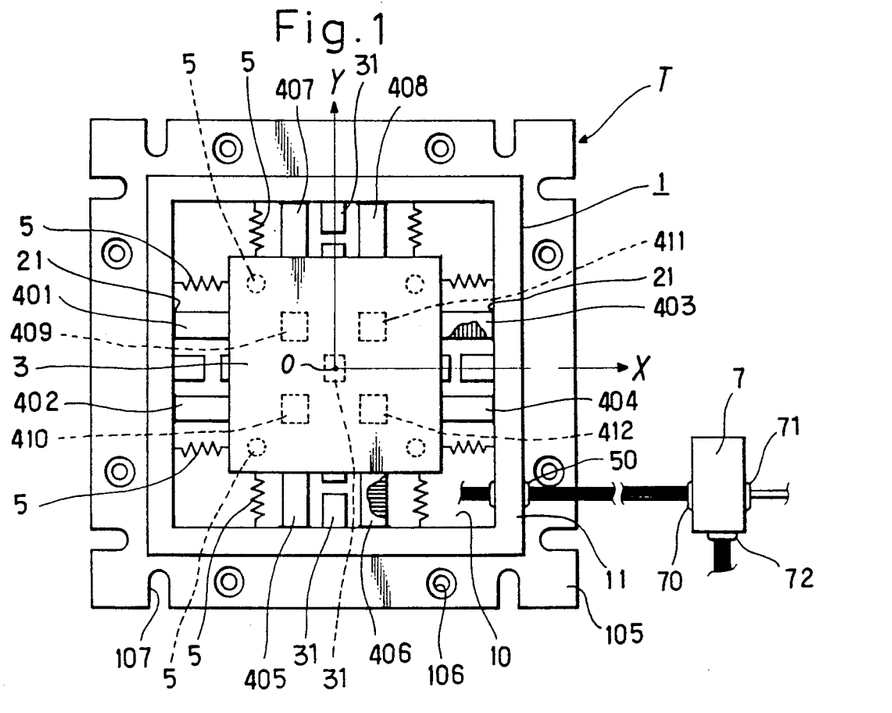
FIG. 1 is a plan view showing one embodiemnt of a device for vibrating materials to be ground according to the invention.
Figure 2:
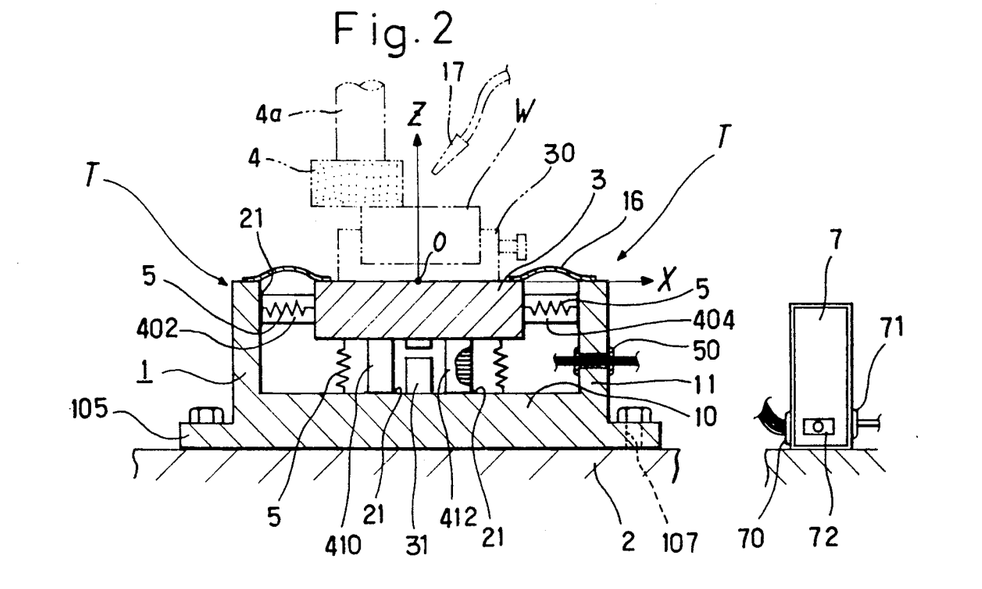
FIG. 2 is a cross sectional view thereof.
Figure 3:
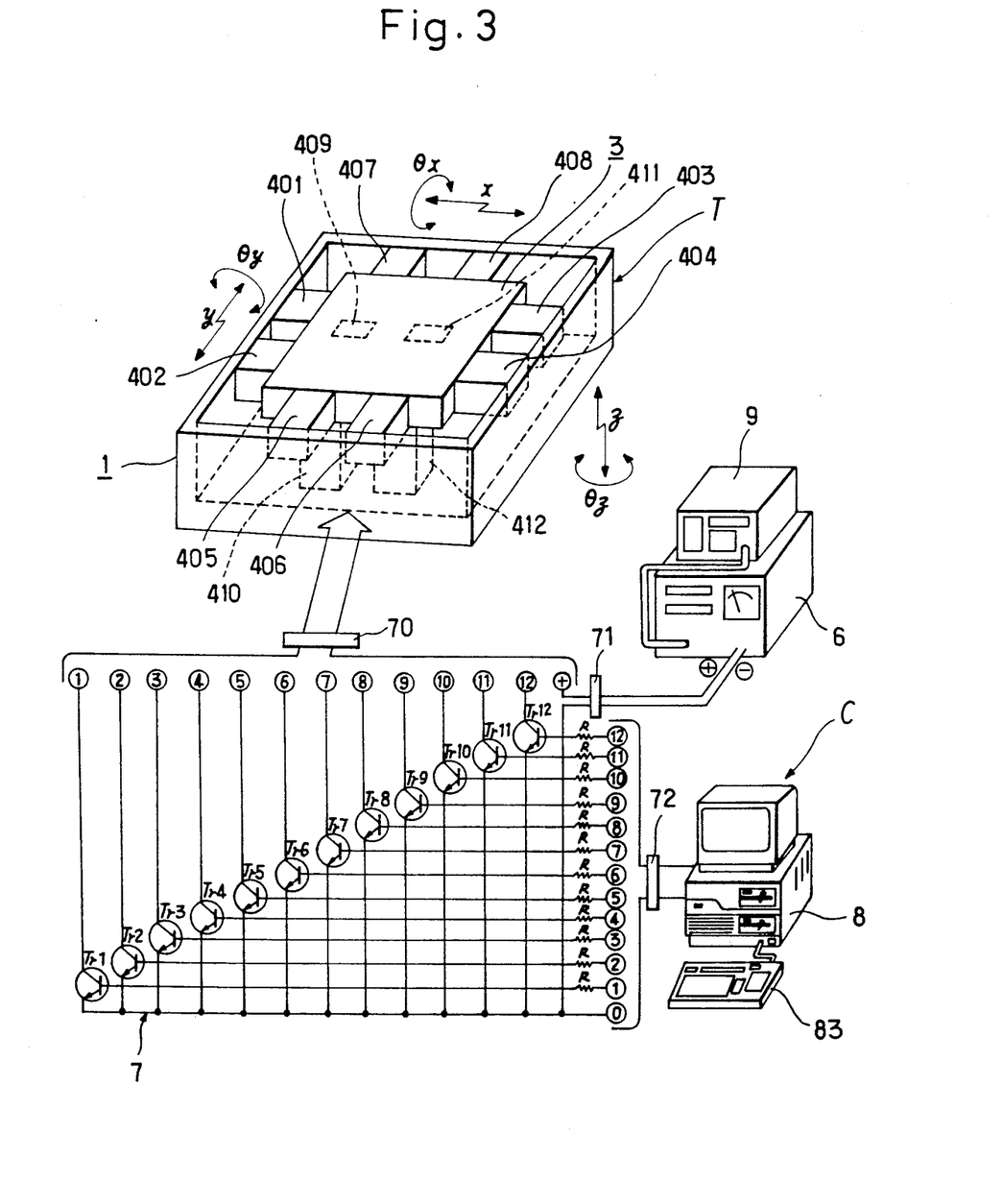
FIG. 3 is an explanatory view showing one example of a control system of the present device.

The device for vibrating materials to be ground of the invention is as a whole composed of a main body T and an electric controller C as seen in FIG. 3. FIGS. 1 and 2 show the main body T, and 1 is a base which is made of a material strong in mechanical strength such as a steel. In the present embodiment, the base 1 is shaped in box having an opened upper surface, composed of a bottom 10 and a peripheral wall 11. At an outside of a lower part of the base 1, a seat 105 is defined where the base 1 is detachablly supported on the desired processing machine table 2 by securing holes 106, securing grooves 107, bolts and clampers. "Processing machine table" includes all of tables which are stationary, reciprocating or rotatable to be installed in the processing machine such as the grinder table, NC table or the machining center table.

3 designates a table which supports and fixes a workpiece W which is independent of the base 1. The workpiece W is fixed on the table 3 by known holding instrument 30 as a vise, magnet chuck or vacuum chuck. Anti-water covers 16 are stretched over between the periphery of the table 3 and the peripheral wall 11 of the base 1 for avoiding a processing liquid, not obstructing vibration of the table 3, and the cover 16 is made of a flexible material as rubber or plastic.

The table 3 is positioned centrally of the base 1, and each of X-, Y- and Z-directions is supported by the base 1 by means of a plurality of groups of piezoelectric actuators 401 to 412.

The actuators are twelve in this embodiment, and as is seen in FIG. 1, with respect to the actuators 401 to 404 in the X-direction, one group comprises two actuators which are opposite equidistantly between left and right inner faces of the peripheral wall 11 and the table 3. The actuators 405 to 408 in the Y-direction each comprise two with equidistant space between upper and lower inner faces of the peripheral wall 11 (in FIG. 1) and the table 3. The actuators 409 to 412 in the Z-direction comprise each four disposed equidistantly between the bottom 10 and the lower surface of the table 3.

The actuators 401 to 412 are strong in giving vibration and excellent in the mechanical strength. Suitable one is such as having a property being able to vibrate at the non-resonating point. Actually, a laminated piezoelectric element is employed. The laminated piezoelectric element is shown with the reference numeral 40 in FIGS. 2-A and 2-B, and is thin as, e.g., not more than 0.1 mm, and is laminated with a plurality of piezoelectric ceramics 41 shaped in wafer polarized in thickness such that the polarization directions are opposite per each of layers. This kind of element creates a large difference with small actuation voltage, and is excellent in displacing responsibility and temperature stability. In FIG. 2-A, 42 is an insulating cover, 43 is a positive lead, and 44 is a negative lead.

With respect to each of the actuators 401 to 412, at least one end in an expansion direction should be necessarily fixed to the base 1, while the other end be always closed to the table 3 not to separate at vibration of the table. In the embodiment shown in FIGS. 1 and 2, the actuators 401 to 412 are connected to the peripheral wall 11 or the bottom 10 at one ends in the expansion direction via a strong adhesive 21 such as epoxy group, and the base 1 is connected to the table 3 via tension springs 5 making pairs with the actuators. By the force of the spring 5, the end of the actuator is connected to the outer face of the table.

In the embodiment shown in FIG. 2-A, the laminated piezoelectric element 40 composing the actuator is cylindrical with a penetrating hole 45, and is connected to the base 1 at its end the adhesive 21. In correspondence to the penetrating hole 45, the table 3 is formed with a female hole 300, and the base 1 is formed with a passage 100 communicating with an enlarged hole 101. The penetrating hole 45 is of course protected with an insulating material. A bolt 46 runs through the passage 100 and the penetrating hole 45 from the enlarged hole 101, and the bolt 46 is inserted into the female hole 300 at its screwed end portion 460. A spring 48 is interposed between a head 461 within the enlarged hole 101, and a shim 47 positioned at the bottom of the hole, by which the bolt 46 is biased to the left, and an end of the element 40 is pressed to the outer face 301 of the table 3 so as to effect a pre-pressure. This system has an advantage that the extent of pre-pressure may be easily changed by controlling the screwing amount of the bolt 46.

For the laminated piezoelement, a piezostack of Langevin type may be employed. This type is as seen in FIG. 2-B that the piezoelectric ceramics 41 sliced in wafer are laminated, and the bolt 46 passes through the hole 45 formed in a center thereof, so that an upper and a lower ends are fixed at a determined pre-pressure. When this type is used, a spring is omitted, and the screw portion 460 extending from one end is screwed into the female hole 300 of the table 3, and the bolt head 461 extending from the other end is fitted in a hole 102 formed in the base 1 and is secured to the bolt head with an adhesive 21. The table 3 is displaced at this time by balancing between the elongation of the piezoelectric ceramics and the elastic deformation of the center bolt 46.

The control device C not only turns ON and OFF actions of the piezoelectric actuators 401 to 412, but also selects them in response to the processing kinds, manners, conditions and so on, and ignites the selected one with the same or different voltage simultaneously in time or at time lag. The control device C is, as shown in FIG. 3, provided with a power amplifier 6 of high speed type repesented by at least bypolar electric source, an electric device controller 7 and a computer 8.

The electric device controller 7 is provided with a connector 70 for the piezoelectric actuators 401 to 412, a connector 71 for the power amplifier 6, and switching circuits. FIG. 3 shows the switching circuits as transistors Tr1 to Tr12 of one step for simplification. With respect to terminals of the connectors of FIG. 3, ① corresponds to the piezoelectric actuator 401, ② to the piezoelectric actuator 402, and the last ⑫ to the piezoelectric actuator 412. A connector 72 is disposed at the of the switching circuit, the connector 72 being for inputting the control signal, to which D/A convertor 81 of the computer 8 is connected (see FIGS. 4 and 5). In the actuators 401 to 412, the positive poles (or negative poles) are rendered common, and the common leads and leads (12) of other poles are lead outside of the base 1 via the rubber bush 50 and connected to the connector 70 as shown in FIGS. 1 and 2.

For the computer 8, for example, a microcomputer or a personal computer is employed for signal-controlling an output voltage issued from the power amplifier 6 by the program provided in the main body 80 including CPU, memories and others. That is, the output voltage is assigned to all of the piezoelectric actuators 401 to 412 or especial ones, and an extent of the voltage is controlled.

Preferably, a function generator 9 is connected to the input, side of the power amplifier 6. The function generator 9 controls output frequency of the power amplifier 6, and produces various variations as sinusoidal waves, saw waves or short waves. If the function generator is used jointly, it is possible to combine control of the frequency by said joint use, rough control of the frequency and the voltage level by the computer 8, so that the flexibility of the control signal may be increased for the actuators 401 to 412.

Figure 4:
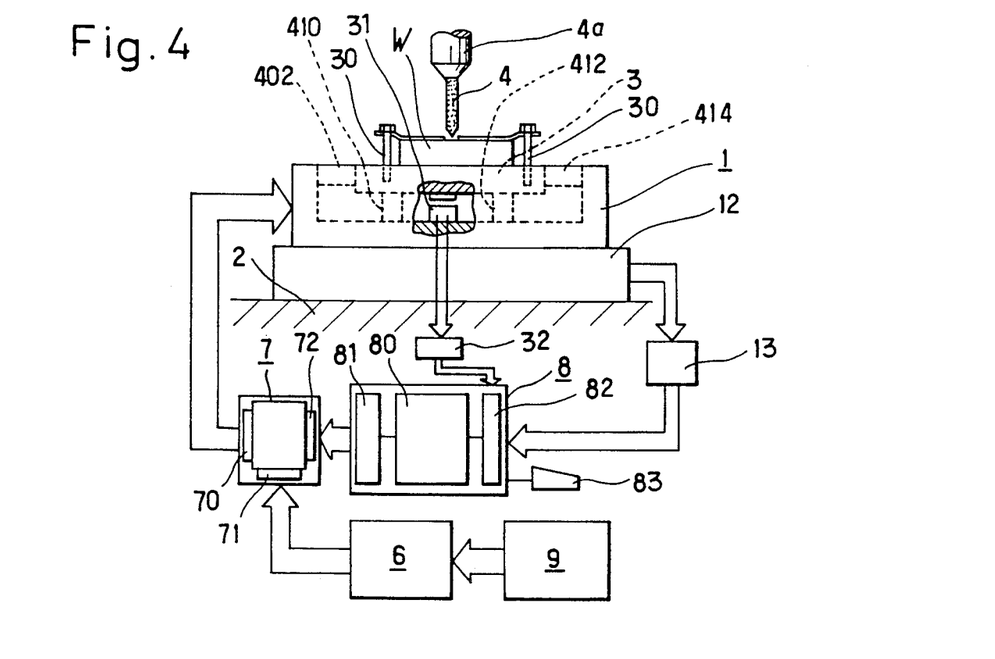
FIG. 4 is an explanatory view showing a practicing condition and a control system.
Figure 5:
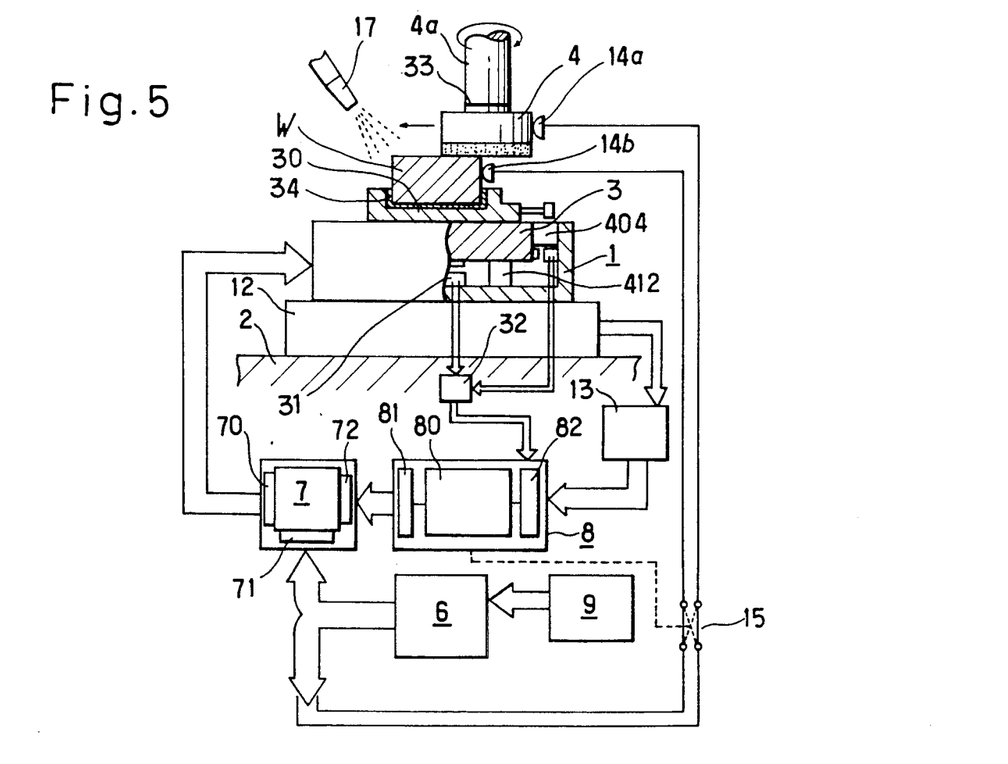
FIG. 5 is an explanatory view showing a practicing example and a control system.

For actually practicing the present device, it is desirable to control the feedback. For this purpose, vibration displacement detectors 31, for example, displacement gauges of eddy current type are incorporated respectively, as shown in FIGS. 1 and 2, between the base 1 and the table 3, especially with respect to X- and Y-directions, between two piezoelectric actuators, and with respect to Z-direction, at the center of four piezoelectric actuators. The vibration displacement detector 31 is connected to the input 82 of the computer 8 via the amplifier 32 as shown in FIGS. 4 and 5. If this instrument is used, vibration displacement between the table 3 and the end of the actuator at the base, and a response frequency are measured by in-process, and informations thereof are calculated by the computer 8, and ignition voltage to the actuators 401 to 412 is amended. Thus, it is possible to effect vibration proper to the processing.

It is desirable to position a grinding resistance (load) detector 12 as a load cell for other feed back element, as shown in FIGS. 4 and 5, between the lower surface of the base 1 and the processing machine table 2. This grinding resistance detector 12 is connected at its output to an input 82 of the computer 8 via the amplifier 13, so that it is possible to select the optimum piezoelectric actuator and control the ignition voltage in response to the resistance (load) given to the workpiece W during processing.

FIG. 5 shows the proper control for applying the present device to a complex machining, for example, discharge machining or electrolytic machining. In this embodiment, the grindstone 4 and the main shaft 4a are isolated electrically by an isolating material 33 and the workpiece W and a securing means 30 are also the same with an isolating material 34. Wirings of feeder brushes 14a, 14b to the grindstone 4 and the workpiece W are connected to an output branched from the power amplifier 6 via a polar changing switch 15.

Figure 9:
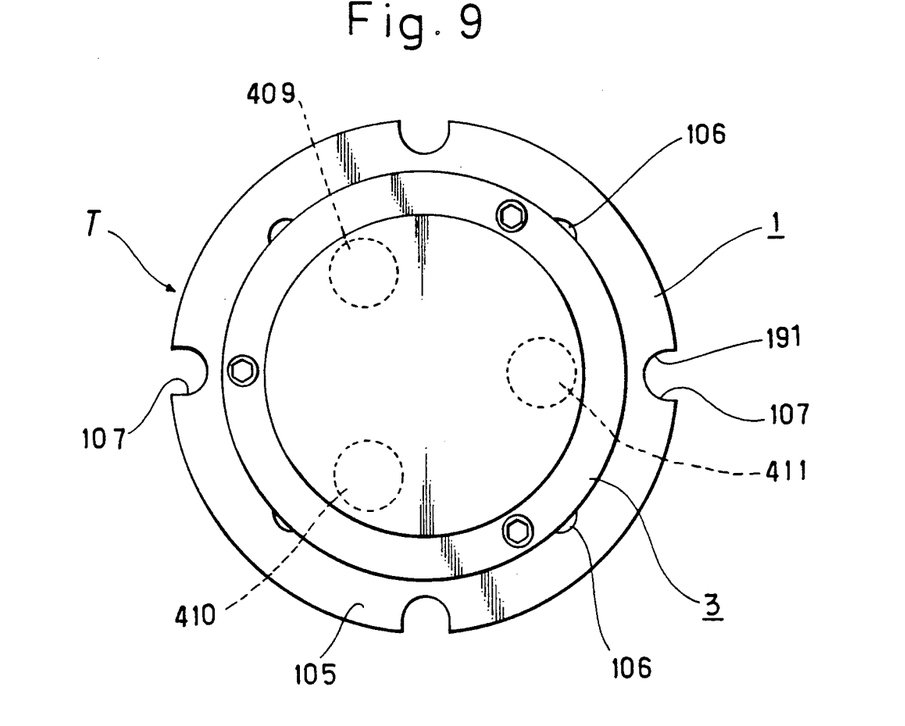
FIG. 9 is a plan view showing the other embodiment of the invention.
Figure 10:
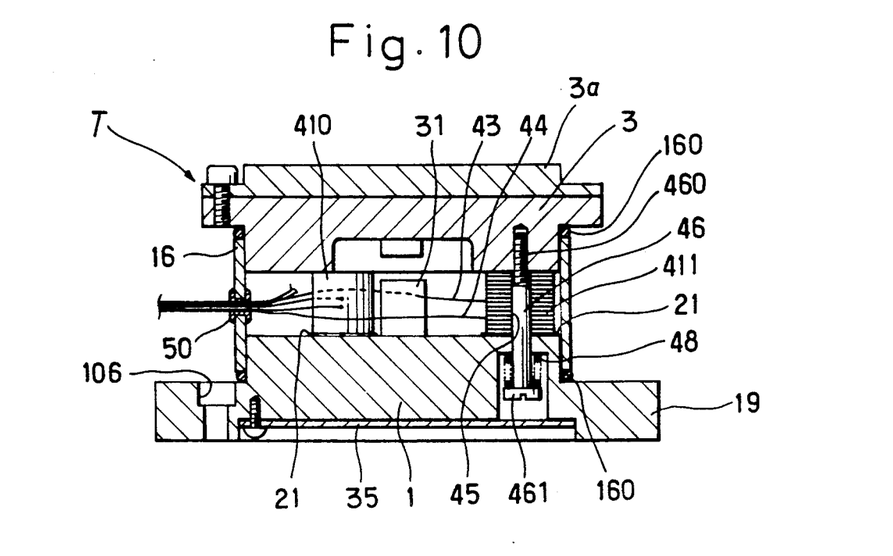
FIG. 10 is a cross sectional view thereof.

FIGS. 9 and 10 show another embodiment of the invention, which shows a plain type for giving vibration in Z-direction only where the base 1 is disc-shaped and formed with a seat 105 at its lower outside for the process machining table, which is formed with fixing holes 106 and fixing grooves 107. Table 3 is positioned above the base 1 and is capped with a plate 3a which may be omitted.

The three cylindrical piezoelectric actuators 409 to 411 are disposed equidistantly and are secured at the lower surfaces on the upper surface of the base 1 with the adhesive 21. The upper surface of the table 3 is contacted to the lower surface of the table 3, and the pre-pressure is given to the piezoelectric actuators 409 to 411 by the system of the bolt 46 and the spring 48 shown in FIGS. 2-A. In this embodiment, a water-proof cover 16 encircles the upper and outer periphery of the base 1, the lower and outer periphery of the table 3 and a space therebetween, and is sealed with 0-rings 160, 160 at the both ends of the cover 16 so as to protect the piezoelectric actuators from the processing liquid. A vibrating displacement detector 31 is incorporated at the center of the base 1, and a backing cover 35 is attached to the bottom of the base 1.

A control device to the body T shown in FIGS. 9 and 10 is omitted in depiction and description, since it is the same as those shown in FIGS. 3 to 5.

In the embodiment of FIGS. 1 to 3, the base 1 and the table are rectangular in plan, and of course may be circular in plan. Number of the piezoelectric actuators is not limited to twelve. The same may be applied to the embodiment of FIGS. 9 and 10, and the piezoelectric actuators may be four or five.

An explanation will be made to the usage of the present device and actuations thereof. For processing, the device T is mounted on the desired process machining table 2 or the grinding resistance detector 12, and is secured by means of the fixing holes 106 and the fixing grooves 107 of the seat 105. When the power amplifier 6 is not actuated, the voltage is not ignited to the piezoelectric actuators 401 to 412, and so the table 3 holding the workpiece W is supported statically on the base 1 by means of the actuators 401 to 412 and functions as an ordinary work table. Therefore, the machining process is carried out by pressing the rotating grindstone 4 to the work W at predetermined load, and moving the machining table 2 or moving the grindstone 4 for giving a desired feed.

If the power amplifier 6 is actuated, the driving voltage is communicated to the actuators 401 to 412 via the electric device 7, and the piezoelectric elements 401 to 412 sink. Since said sinking is transmitted to the table 3 mechanically, the table 3 is vibrated, and the workpiece W is also moved accordingly.

At the same time, the control signal is input to the electric device controller 7 from the computer 8. Thereby, the amplitude and the direction of the vibration are controlled. That is, the amplitude of the vibration is realized by sending the control signal from the computer 8 with respect to the determined output of the power amplifier 6, and the ignition voltage to the actuators 401 to 412 changes. The vibrating direction may be determined at disposal by sending a signal as to which actuators 401 to 412 the voltage is ignited to from the computer 8. In other words, if the ignition is given to the actuators 409 to 412 for Z-axial direction, the vibration is provided in a normal grinding force, and if it is given to the actuators 405 to 408 for Y-axial direction, the vibration is provided in a tangential grinding force, and if it is given to the actuators 401 to 404 for X-axial direction, the vibration is provided in lateral direction. Further, if the ignition is concurrenty given to the actuators in different directions, for example, in Z- and X-directions, complicated vibrations compounded with more than two directions are provided.

A plurality of piezoelectric actuators form one group in X-, Y-, and Z-directions, respectively. Therefore, if the actuators composing respective groups are ignited at the same time, translational vibrations are effected on the table 3. If these actuators are ignited successively at time lag, such a vibration pattern including rotational vibration is formed. The above vibrations may be controlled by the control signal issued from the computer 8.

If the frequencies to the piezoelectric actuators are selected in the above vibrating direction and the vibrating patterns, the vibration mode may be made variable between vertical vibration in thickness and area vibration.

With respect to the displacement control system according to the invention, the relations between the voltage polarities, the displacing directions and the rotating directions to be ignited to the actuators 401 to 412 are as follows.

Translation in +X direction:
①+, ②+, ③−, ④−
Translation in +Y direction:
⑤+, ⑥+, ⑦−, ⑧−
Translation in +Z direction
⑨+, ⑩+, ⑪+, ⑫+
Normal rotation around X axis:
⑨+, ⑩−, ⑪+, ⑫−
Normal rotation around Y axis:
⑨+, ⑩+, ⑪−, ⑫−
Normal rotation around Z axis:
①−, ②+, ③+, ④−, ⑤−, ⑥+, ⑦+, ⑧−

Accordingly, for moving the table 3 to (x, y, z) coordinate, it is enough to ignite the voltage in proportion to ① x, ② x, ③ −x, ④ −x, ⑤ y, ⑥ y,
⑦ −y, ⑧ −y, ⑨ z, ⑩ z, ⑪ z, ⑫ z for the piezoelectric actuators.

For rotating the table 3 at ($\theta x, \theta y, \theta z$), it is enough to ignite the voltage in proportion to ① $-\theta z$, ② $\theta z$, ③ $\theta z$, ④ $-\theta z$, ⑤ $-\theta z$, ⑥ $\theta z$, ⑦ $\theta z$,
⑧ $-\theta z$, ⑨ $\theta x + \theta y$, ⑩ $-\theta x + \theta y$, ⑪ $x - \theta y$,
⑫ $-x - \theta y$.

For compounding these translations and the rotational movement, it is enough to ignite the voltage in proportion to ① $x - \theta z$, ② $x + \theta z$, ③ $-x + \theta z$, ④ $-x - \theta z$, ⑤ $y - \theta z$,
⑥ $y + \theta z$, ⑦ $-y + \theta z$, ⑧ $-y - \theta z$, ⑨ $z + \theta x + \theta y$,
⑩ $z - \theta x + \theta y$, ⑪ $z + \theta x - \theta y$, ⑫ $z - \theta x - \theta y$.

With respect to the voltage igniting the piezoelectric actuators 401 to 412, it is more controllable to shift the table 3 to +side or −side, and vibrate mainly about the shift voltage than vibrating it between + and −. This is preferable in view of easily giving pre-pressure to the piezoelectric actuators. In this case, assuming that the shift voltage is Vs, the ignition voltage is as follows.

① $Vs + x - \theta z$, ② $Vs + x + \theta z$, ③ $Vs - x + \theta z$,
④ $Vs - x - \theta z$, ⑤ $Vs + y - \theta z$, ⑥ $Vs + y + \theta z$,
⑦ $Vs - y + \theta z$, ⑧ $Vs - y - \theta z$, ⑨ $Vs + z + \theta x + \theta y$,
⑩ $Vs + z - \theta x + \theta y$, ⑪ $Vs + z + \theta x - \theta y$,
⑫ $Vs + z - \theta x - \theta y$.

For making the translational movement in the vibrating table, following an oval track (large diameter: A, small diameter: B) within XY plain, it is enough to ignite the voltage which is $x = A \cos\omega t, y = B \sin\omega t$ ($\omega = 2\pi T$, T is period of making one round)

as function of time. If (x, y, z, $\theta x, \theta y, \theta z$) are given as the function of time, it is possible to create every kind of the vibrating patterns within the displacements of the piezoelectric actuators. The control signal as the functions of time may be easily created by preparing them as software in the computer 8.

Figure 6:
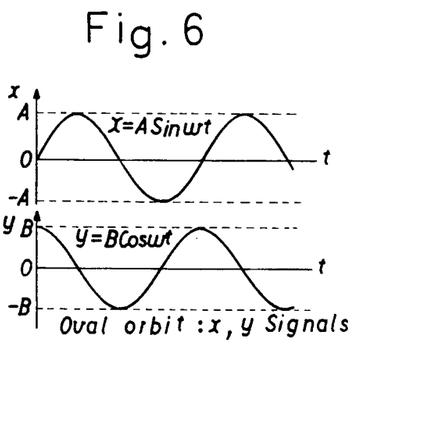
FIG. 6 is waves showing examples of controlling vibration of the table of the invention.
Figure 7:
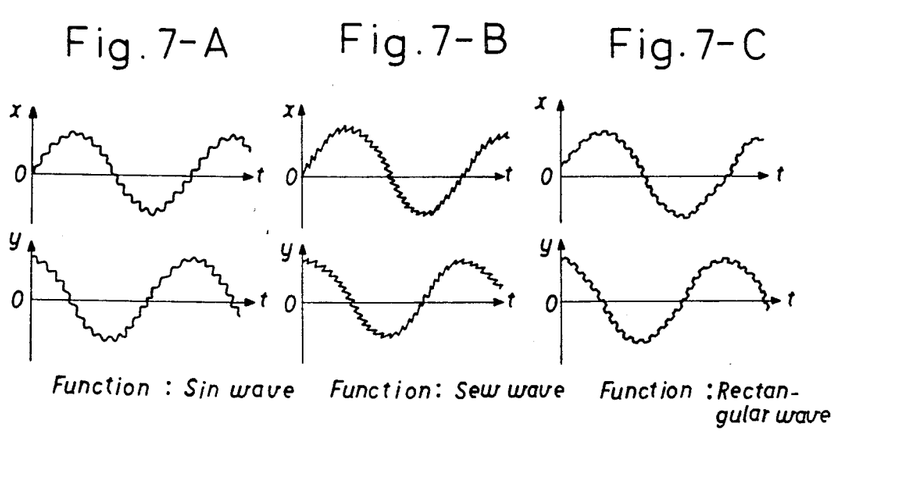
Figure 8:
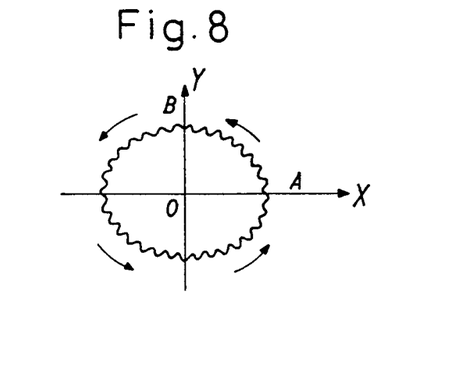
FIG. 8 is a line showing a track of the table obtained by FIG. 7-A.

When the function generator 9 is used jointly, the output signal is fixed at DC level, and if the signal of the computer 8 is made as shown in FIG. 6, the table 3 draws the oval track within the XY plain. If the signal frequency and the wave of the function generator 9 are varied, complicated waves as shown in FIGS. 7-A to 7-C may be easily obtained. Therefore, the table 3 is caused to draw an oval track as FIG. 8 by the complicated wave vibrating therearound.

Further, when the device T and the machining resistance detector 12 are combined, the flexible vibration is possible in response to grinding resistance by the feed back system.

For example, if the computer 8 is programmed such that the vibrating amplitude is increased when the grinding resistance becomes larger, amount of non-grinding which is generated by escaping from the grindstone or the workpiece due to the grinding resistance, may be reduced. The workpiece can be chamfered at its edge by detecting changings in the grinding resistance at starting or ending of the cutting, and it is possible to avoid pitching of the hard and brittle material, which is easily caused. The changing of the grinding resistance during processing is more effective in a surface finish-grinding process where the area being ground changes such as a cup typed grinder, than a straight typed grinder.

In an example of FIG. 5, the power amplifier 6 as the driving source of the table 3 may be used as a discharging-electrolyting source. So, facility cost and processing cost are saved without requiring addition of any special electric source unit. Besides, it is possible to synchronize the displace of the table 3, the effects of discharging-electrolyting between the grindstone and the workpiece, or synergetic effects which could not be realized ordinarily. A discharging grinding and an electrolyting grinding are selected in dependence upon processing liquids supplied from a coolant nozzle 17.

In this process, the polarity of the voltage between the grindstone and the workpiece can be easily switched by the polarity changing switch 15, and the automatic switch by an order from the computer 8 is possible. Therefore, the workpiece can be processed at high efficiency by the workpiece side (+) and the grindstone side (−), and the grindstone can be dressed at high efficiency by the workpiece side (−) and the grindstone side (+). If the grinding resistance is not reduced in spite of the complicated control of the table 3, a sequence which carries out the automatic dressing by the in-process not intermitting the process, can be composed by pre-programming for automatically switching the polarity of the ignition voltage between the grindstone and the workpiece.

According to the invention, prominent cuttings as exemplified under could be realized.

I. Since the table can make various vibrations, fine crackings of the workpiece are more accelerated than vibrating the tool, and since the grinding resistance is reduced, the processing amount is increased and the cutting is performed at high efficiency.

II. The dressing of the grindstone is always made by the vibration, and the grindstone can be prevented from clogging or moderated therefrom.

III. High precise and complicated shapes can be processed because the vibrating directions are various and the freedom of the pattern is high, the control is easy, and the grindstone is not limited by shapes or sizes.

IV. Since the freedom of the vibration is high, it is easy to determine the cutting amount of the grindstone at a range of plastic destruction particular to the nature of the work, and it is possible to obtain desired roughness of cut surfaces as ground surfaces.

V. No restriction is provided about the grindstone, and if the invention is applied to the grinding process with free grinding powders, the fine vibrations of free-grinding powders may be obtained by the vibration of the work being processed, and it is possible to expect a satisfied grinding effect on the ground surface and the moderate dressing of the grindstone.

VI. If the invention is applied to the grinding process compounded with the discharging process, it is possible to accelerate the discharging effectively between the workpiece and grindstone, and since the discharging is uniformalized, it is possible to expect the grinding effect by discharging on the ground surface and the moderate dressing effect of the grindstone.

VII. If the invention is applied to the grinding process compounded with the electrolysis, it is possible to expect the moderate dressing effect of the grindstone and the grinding effect on the ground surface, since the vibration accelerates the penetration of the electrolyte and its fluidity.

VIII. Although the above mentioned features may be obtained, the structure of the device is simple and is enough with the frequency of the vibration of not more than 1500 Hz especially around 150 to 500 Hz. So, the device is small in size, easy to handle and economical.

Further references will be made to a producing and using examples.

The piezoelectric actuators were the cylindrical laminated type of 18.4 mm$\phi$ in an outer diameter, 7 mm$\phi$ in an inner diameter and 18 mm in height, having 170 sheets of laminated PZT ceramics of 100 um in thickness. The vibrations of 16 $\mu$m were made with the actuation voltage of 150 V, having the compression force of 6000 kg/cm$^2$, the tension strength of 100 kg/cm$^2$ and the selfresonant frequency of 67 KHz. The Young' rate at actuation of 150 V was $5.6 \times 10^{10}$ N/m$^2$. The stold force of 800 kgf was generated.

The twelve piezoelectric actuators are positioned between the base and the table as seen in FIGS. 1 and 2, and are connected to the table at its end with the epoxy resin and to the table at its end with the practice as shown in FIG. 2-A. The table is 100 mm in width and length and 20 mm in thickness. The total height of the device is 80 mm.

The grinding machine was a portal machining center, on the table of which the device was placed via the load cell. The grindstone was a cast iron fiber bond diamond (core drill type, $\phi$ 10 mm, #60/80). The table vibrating electric power was a high speed power amplifier function synthesizer and the signal of the load cell was incorporated into the personal computer.

Figure 11:
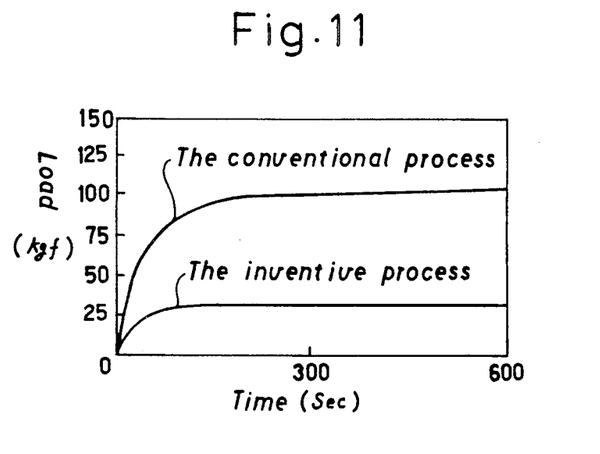
FIG. 11 is a graph showing a load changing in comparison with a foregoing method when the present invention is used to coring of a fine ceramics.

The machining experiment was carried out on the alumina ceramics (50×50×200 mm, and Hv=1700) in the vertically cutting direction (10 mm). The vibration was given in the Z-direction by the most simplified practice of driving simultaneously the four piezoelectric actuators. The peripheral speed was 200 m/min, the feed was 1 mm/min. For comparison, the conventional normal practice which did not give the vibration to the table was performed under the same conditions, and the results are shown in FIG. 11.

The load in the vertical direction of the conventional practice was 100 kgf, but according to the present invention, the actuation voltage was 150 V, the frequency was 200 Hz, and the vibration was 15$\mu$ mp-p, and in the sinusoidal wave, the load was 30 kgf, that is, reduced to about $\frac{1}{3}$ of the conventional practice, because the breaking of the workpiece was accelerated by the strong vibration of the piezoelectric actuators.

Figure 12:
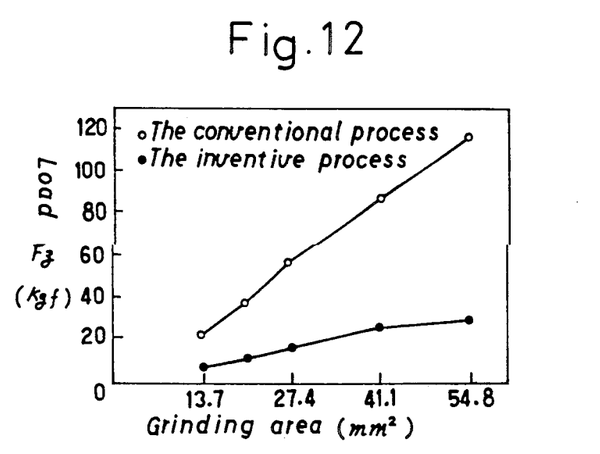
FIG. 12 is a graph showing relation between a ground area and a load when a grinding width is changed.

The relationship between the cutting area and the vertical load was studied at the feeding rate of 2 m/min by changing the cutting width of the coring, and the results are shown in FIG. 12 where 13.7 mm$^2$ of the cutting area was $\frac{1}{4}$ face cutting, 27.4 mm$^2$ was a half face cutting and 54.8 mm$^2$ was an overall cutting. In the conventional practice, the load of the overall cutting was more than 110 kgf, but in the vibration coring of the invention, the load in each of the ground faces was controlled $\frac{1}{2}$ to $\frac{1}{3}$ of the conventional practice.

The feed speed and the load at coring was studied. In the conventional practice, the feed speed was 2 mm/min to the maximum and the workpiece was broken at 4 mm/min. In the invention, the coring could be performed stably at 45 kgf, in spite of the high speed of 10 mm/min.

The durability of the table was investigated. The table was vibrated without causing any problems, in spite of 250 kgf of the load in the vertical direction and the continuous vibration for 8 hours at 2000 Hz.

Figure 13:
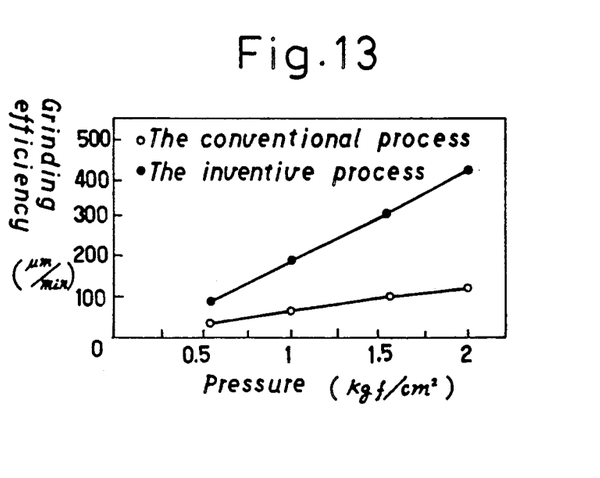
FIG. 13 is a graph showing grinding efficiency when the present invention is used to finishing of the surface of the fine ceramics.

In view of the above durability of the table, the finish processing was made to the same workpiece by the pressure giving practice. The grindstone was a cast iron fiber bond grindstone (cut grindstone, $\phi$ 200, grain size #4000), the peripheral speed of 569 m/min and the same vibrating condition as the above said coring. The results thereof are shown in FIG. 13. Depending on the present invention, the grinding efficiency exceeding more than twice of the conventional practice could be realized, because the brittle fracture of the ceramics was accelerated by the impact of the vibration and the increasing effect of the pressure.

The device for vibrating the workpiece to be processed is applicable to the brittle materials such as fine ceramics, glasses, carbide alloys, and further to the whole processes using the grinding powders to the ferrite, silicon and so on. The processes using the grinding powders include surface grinding, cylindrical grinding, internal grinding, lapping grinding, free grinding, groove grinding, thread grinding, and abrasive cut-off.

What is claimed is:

1. A device for vibrating a workpiece to be ground with a rotating tool having a grindstone on a processing machine having a machine table, said device comprising a support table for supporting the workpiece; a base to be detachably mounted on the machine table of the processing machine; a plurality of piezoelectric actuators for supporting said support table on said base, each of said plurality of piezoelectric actuators being electrically connected to an external controller for receiving a driving voltage therefrom for vibrating the workpiece being ground, and each of said plurality of piezoelectric actuators comprising a plurality of laminated elements and opposite ends secured to said support table and said base, respectively; and spring means for securing a respective one of said opposite ends to said support table with a pre-pressure to prevent separation of the respective one of said opposite ends from said support table upon vibration of said support table.

2. A device for vibrating a workpiece to be ground with a rotating tool having a grindstone on a processing machine having a machine table, said device comprising a support table for supporting the workpiece; a base to be detachably mounted on the machine table of the processing machine; a plurality of piezoelectric actuators for supporting said support table on said base, each of said plurality of piezoelectric actuators being electrically connected to an external controller for receiving a driving voltage therefrom for vibrating the workpiece being ground, and each of said plurality of piezoelectric actuators comprising opposite ends connected to said support table and said base, respectively, and a plurality of cylindrical laminated elements having central holes, a bolt having a shank and extending through said central holes and screwed into a respective hole in said support table; and spring means provided on an outer periphery of said shank for securing a respective one of said opposite ends to said support table with a pre-pressure.

3. A device for vibrating a workpiece to be ground with a rotating tool having a grindstone on a processing machine having a machine table, said device comprising a support table for supporting the workpiece; a base to be detachably mounted on the machine table of the processing machine; a plurality of piezoelectric actuators for supporting said support table on said base, each of said plurality of piezoelectric actuators being electrically connected to an external controller for receiving a driving voltage therefrom for vibrating the workpiece being ground, and each of said plurality of piezoelectric actuators being formed as a Langevin piezostack having opposite ends secured to said support table and said base, respectively; and bolt means for securing a respective one of said opposite ends to said support table with a pre-pressure.

4. A device for vibrating a workpiece to be ground with a rotating tool having a grindstone on a processing machine having a machine table, said device comprising a support table for supporting the workpiece; a base to be detachably mounted on the machine table of the processing machine; and a plurality of piezoelectric actuators for supporting said support table on said base; and an external controller electrically connected with each of said plurality of piezoelectric actuators for communicating driving voltage thereto for vibrating the workpiece being ground, said external controller comprising electric control means including a switching circuit for each of said piezoelectric actuators, amplifier means connected with said electric control means, and computer means for controlling an output of said power amplifier means to a respective one of said plurality of piezoelectric actuators to thereby control a voltage level communicated to the respective one of said plurality of piezoelectric actuators.

5. A device as claimed in claim 4, further comprising a function generator for controlling an output frequency of said power amplifier means.

6. A device for vibrating a workpiece to be ground with a rotating tool having a grindstone on a processing machine having a machine table, said device comprising a support table for supporting the workpiece; a base to be detachably mounted on the machine table of the processing machine; a plurality of piezoelectric actuators for supporting said support table on said base, each of said plurality of piezoelectric actuators being electrically connected to an external controller for receiving a driving voltage therefrom for vibrating the workpiece being ground; and grinding resistance detecting means located between said base and the machine table of the processing machine and connected with said external controller for separately controlling the driving voltage to each piezo electric actuator in accordance with a grinding resistance and each of said plurality of piezoelectric actuators comprising a plurality of laminated elements and opposite ends secured to said support table and said base, respectively.

7. A device as claimed in claim 6, wherein said grinding resistance detecting means comprises a displacement element for detecting vibration-caused displacement of said base.

8. A device for vibrating a workpiece to be ground with a rotating tool having a grindstone on a processing machine having a machine table, said device comprising a support table for supporting the workpiece; a base to be detachably mounted on the machine table of the processing machine; a plurality of piezoelectric actuators for supporting said support table on said base; and an external controller electrically connected with each of said plurality of piezoelectric actuators for communicating driving voltage thereto for vibrating the workpiece being ground, said external controller comprising means for separately controlling time of actuation of said piezoelectric actuators and voltage levels communicated to said piezoelectric actuators and each of said plurality of piezoelectric actuators comprising a plurality of laminated elements and opposite ends secured to said support table and said base, respectively.

9. A device as claimed in claim 8, wherein said base comprises a box body having a bottom and side walls, said support table is placed in the center of said box body, and said plurality of piezoelectric actuators includes a first group of piezoelectric actuators extending between first opposite side wall and said support table in an X-direction, a second group of piezoelectric actuators extending between second opposite wall and said support table in a Y-direction, and a third group of piezoelectric actuators extending between said bottom and said support table, each piezoelectric actuator of said first, second and third groups of piezoelectric actuators having opposite ends connected with said base and said support table, respectively.

10. A device as claimed in claim 8, wherein said base comprises a disc body having an upper surface, said support table having a lower surface and being placed above said disc body, said plurality of piezoelectric actuators extending between said upper surface of said disc body and said lower surface of said support table and having opposite ends connected with said upper surface of said disc body and said lower surface of said support table, respectively.

* * * * *